3,168,447
METHOD OF PREPARING STABLE HUMAN PROFIBRINOLYSIN AND FIBRINOLYSIN
John H. Hink, Jr., and John K. McDonald, Berkeley, Calif., assignors to Cutter Laboratories, Inc., Berkeley, Calif., a corporation of Delaware
No Drawing. Filed June 11, 1962, Ser. No. 201,324
4 Claims. (Cl. 195—66)

This invention relates to and in general has for its object the provision of a method for purifying human profibrinolysin.

Human plasma fibrinolysin in purified and concentrated form has been found to be very useful in dissolving thrombi (blood clots) which are formed pathologically in the veins of humans. Fibrinolysin is a proteolytic enzyme with a very high affinity for the substrate fibrin, which is the main component of a blood clot. Although this affinity is well recognized, it is known that the proteolytic enzyme fibrinolysin is not completely specific. Fibrinolysin will attack and change proteins other than fibrin, especially in the absence of fibrin. When fibrinolysin is prepared in a highly purified form it will, while in solution under physiological electrolyte conditions, be autoproteolytic. That is to say, fibrinolysin will act upon itself and effect proteolytic breakdown with an accompanying rapid loss of fibrinolytic potency. This potency reduction can be minimized by chilling of the solution so that the rate of autoproteolytic reaction will be reduced.

Fibrinolysin occurs naturally in the circulation in the form of an inactive precursor, or proenzyme, known as profibrinolysin. In the simplest possible terms, the naturally occurring profibrinolysin is converted to active fibrinolysin by the action of certain activators present in human tissue. In vitro, human profibrinolysin can be converted to fibrinolysin by the action of such activators as urokinase, trypsin, streptokinase or staphylokinase, under suitable condition of pH, temperature, and ionic strength. We prefer to employ urokinase as the activator because it is the only activator known to us which can be prepared from human origin and consequently is non-antigenic, as well as non-pyrogenic.

The starting material for the preparation of fibrinolysin is the standard Cohn fraction III-2,3 as prepared by Method 9 (Oncley et al., Journal of the American Chemical Society, Vol. 71, page 541, 1949).

For purposes of illustrating the technique by which our process can be carried out, the following example is set forth in detail:

*Purification of profibrinolysin*

(1) Suspend eack kg. of the III-2,3 paste in 20 liters of 0.2 M sodium acetate at 4° C. Adjust the pH to 6.2 with HCl and stir at 4° C. for at least three hours. Centrifuge the suspension and collect the precipitate, which we designate as III-4.

(2) Suspend each kg. of the III-4 paste in 37 liters of 0.3 M glycine at 4° C. and adjust the pH thereof to 7.9 with NaOH and stir at 4° C. for at least two hours. Add finely divided tricalcium phosphate to the III-4 suspension in an amount equivalent to 22 gm. tricalcium phosphate per liter of suspension (about 5 gm. tricalcium phosphate per gm. of protein) and stir at 4° for at least three hours. Centrifuge the suspension and collect the precipitate, which consists of profibrinolysin adsorbed onto tricalcium phosphate. Suspend the precipitate in 4° C. water using 24 liters of water per kg. of III-4 paste, and adjust the pH to 3.1 with phosphoric acid. Stir the suspension at 4° C. for three hours while keeping the pH at 3.1. (The phosphoric acid at pH 3.1 dissolves much of the tricalcium phosphate, thereby releasing the highly purified profibrinolysin, a process which we call diselution.) Centrifuge the suspension which remains and discard the precipitate. Adjust the effluent to pH 2.4 with HCl and add sodium chloride to a concentration of 1.2 molar. Allow the suspension to stand at 4° C. for at least three hours and then centrifuge and collect the precipitate, which we designate as III-5.

(3) Suspend eack kg. of the III-5 precipitate in 40 liters of water at 4° C. and adjust its pH to 3.9 with NaOH and stir for one hour. Slowly add an equal volume of 0.3 M NaCl and stir for another hour at 4° C. Centrifuge the suspension at 4° C. and discard the precipitate. Adjust the effluent to pH 5.5 with NaOH and allow to stand at 4° C. for at least two hours. Centrifuge and collect the precipitate, which we designate as III-6.

(4) Suspend the III-6 precipitate in 4° C. water, adjust its pH to 3.7 with HCl and dialyze the solution for 16 hours against 50 volumes of water containing 3.75 Ml. of concentrated HCl per 50 liters. Pass the imperviate through a millipore filtration membrane having a porosity of 0.8 micron. Freeze this profibrinolysin solution at $-20°$ C. or below and hold frozen, or freeze dry.

All conditions cited in the above four-step process are believed to be optimum conditions designed to result in maximum yield and purity of the profibrinolysin. These exact conditions can be varied somewhat and the effect on the final yield and purity will be only a matter of degree. The practical range of pH for both the adsorption and diselution in step 2 has been investigated in detail.

For the adsorption on tricalcium phosphate, at a pH below 7.0 the profibrinolysin begins to become insoluble, resulting in less adsorption but just physical mixing of the insoluble inpure profibrinolysin with the insoluble tricalcium phosphate, so that no purification results throughout the two steps. With increasing pH for the adsorption step, the adsorption is less with increasing pH and is so poor at pH 8.8 that the over-all yield becomes uneconomical.

For the diselution step, with increasing pH there is little diselution, and mostly elution above pH 4.0, and at pH 4.2 most of the profibrinolysin remains adsorbed on the tricalcium phosphate. As the diselution pH decreases from the optimum of 3.1, more and more of the tricalcium phosphate is dissolved until at pH values below 2.5 so much of the adsorbed impurity is set free by solution of the tricalcium phosphate that little purification is effected by the elution part of step 2.

The purified profibrinolysin of this invention when prepared on full production scale ranges in potency from 62–125 Loomis units per mg. N (for Loomis unit, see Proc. Soc. Exp. Biol. Med., Vol. 41, page 657, 1939) or from 120–225 RPMI units per mg. N. When the profibrinolysin is converted to fibrinolysin by employing optimum times and optimum amounts of streptokinase or urokinase, fibrinolysin is obtained of the same potency in terms of units per mg. N as was the potency of the profibrinolysin from which it was derived. There are theoretical reasons to believe that fibrinolysin of a potency of 200 or more RPMI units per mg. N is at least 80% of ultimate purity, and by starch gel electrophoresis we have been unable to demonstrate the presence of more than one component.

The other processes that we are aware of for the purification of profibrinolysin do not employ an adsorption and elution step, but do employ the principle of selective denaturation at both an extremely alkaline pH value and an extremely acid pH value. The fibrinolysin obtained from these selective denaturation processes are generally accepted as being extremely unstable in solution and, in fact, the instructions accompanying those fibrinolysin preparations in clinical use today direct that the preparation, after reconstitution with water, be chilled in an ice bath during intravenous administration. It is generally accepted, and well verified in our laboratories, that the presently available fibrinolysins, after being reconstituted for intravenous administration, lose from 30% to 50% of their activity during 2 to 4 hours at room temperature.

Before the profibrinolysin can be therapeutically useful, it is necessary to convert it to fibrinolysin. This is done in the following manner, and differs from known procedures:

*Conversion of purified profibrinolysin to fibrinolysin*

Thaw the frozen profibrinolysin solution prepared as above set forth and dilute to between 100–200 RPMI units per ml. Warm the solution to 25° C., adjust to pH 8.0 with NaOH and add 3 units of urokinase (or streptokinase) per RPMI unit of profibrinolysin. Stir and hold at 25° C. for 45 minutes. This completes the conversion of the profibrinolysin to fibrinolysin.

*Stabilization of fibrinolysin*

Following this, and for the purpose of stabilizing the fibrinoylsin, the solution is chilled and, while chilled, its pH is adjusted to a pH in the order of 3.2 to 4.3 by the addition of 1 N HCl or comparable acid. To this some inert excipient is added to provide bulk, as otherwise there is virtually nothing to see if and when the solution is dried, as by freeze-drying. The resulting material is then passed through a sterilizing membrane filter and aseptically transferred into sterile final containers, preferably in 500 RPMI units per container, and lyophilized.

Fibrinolysin prepared according to our invention, without exposure to the detrimental effects of very high and very low pH values, has a stability greatly in excess of presently available fibrinolysins. Our fibrinolysin is optimally stable at a pH value of about 4.0. It begins to become less stable at pH 3.2 on the low side and at pH 4.3 on the high side. When prepared according to the procedure outlined in the preceding examples, our fibrinolysin can be reconstituted with water, the resultant pH being approximately 4, and can be held for nine days at room temperature without a measurable decrease in potency or activity.

Fibrinolysin prepared by our process has been administered to many humans in doses as high as 2000 RPMI units per day with no evidence of any sort of toxicity. (For a description of the RPMI unit, see Ambrus et al., American Journal of Cardiology, Vol. 6, page 462, 1960.)

We claim:

1. In the process for purifying the profibrinolysin in a fraction III–4 derived from a standard Cohn fraction III–2,3 of human blood, the improvement comprising adsorbing the profibrinolysin from said III–4 fraction onto tricalcium phosphate in a solution adjusted to a pH of about 7.0 to 8.8, separating the tricalcium phosphate containing the adsorbed profibrinolysin from the solution, and partially dissolving the tricalcium phosphate in an acid solution of a pH of about 2.5 to 4.2, said partial dissolving serving to release highly purified profibrinolysin into solution while contaminating proteins are retained on the undissolved portion of tricalcium phosphate, separating the solution containing the profibrinolysin from said undissolved tricalcium phosphate, and then completing the purification of the profibrinolysin in said solution by isoelectric precipitation and dialysis.

2. The improved process in accordance with claim 1 and including the steps of converting the purified profibrinolysin to fibrinolysin and stablizing the fibrinoslysin by chilling the same, and then adjusting the pH of the chilled fibrinoylsin to a pH on the order of 4.0.

3. In the process for purifying the profibrinolysin in a fraction III–4 derived from a standard Cohn fraction III–2,3 of human blood, the improvement comprising adsorbing the profibrinolysin from said III–4 fraction onto tricalcium phosphate in a solution adjusted to a pH of about 7.0 to 8.8, separating the tricalcium phosphate containing the adsorbed profibrinolysin from the solution, and partially dissolving the tricalcium phosphate in an acid solution of a pH of about 2.5 to 4.2, said partial dissolving serving to release highly purified profibrinolysin into solution while contaminating proteins are retained on the undissolved portion of tricalcium phosphate, separating the solution containing the profibrinolysin from said undissolved tricalcium phosphate, and then completing the purification of the profibrinolysin in said solution.

4. The improved process in accordance with claim 3 wherein said adsorption on the tricalcium phosphate is executed in a solution adjusted to a pH of about 7.9 and said dissolving of the tricalcium phosphate is executed in a phosphoric acid solution having a pH of about 3.1.

References Cited in the file of this patent

UNITED STATES PATENTS

| | | |
|---|---|---|
| 2,624,691 | Loomis | Jan. 6, 1953 |
| 2,923,665 | Hagan | Feb. 2, 1960 |

OTHER REFERENCES

Mullertz: Acta Physiologica Scandinavica, Vol. 30, Suppl. 130, 1956, pages 1 to 66 (pages 48 to 52 particularly relied upon).

Richard et al.: Vox Sanguinis 4, 126–13 (1959).

Ion Exchangers in Organic and Biochemistry, Interscience Publishers Inc., 1957, pages 318 to 335.